United States Patent
Brahma et al.

(10) Patent No.: US 12,246,744 B2
(45) Date of Patent: Mar. 11, 2025

(54) DETECTING OBJECTS AND DETERMINING BEHAVIORS OF OBJECTS

(71) Applicant: VOLKSWAGEN AKTIENGESELLSCHAFT, Wolfsburg (DE)

(72) Inventors: Pratik P. Brahma, Belmont, CA (US); Prateek Agrawal, San Jose, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 268 days.

(21) Appl. No.: 17/070,862

(22) Filed: Oct. 14, 2020

(65) Prior Publication Data
US 2022/0111860 A1    Apr. 14, 2022

(51) Int. Cl.
*B60W 60/00*     (2020.01)
*B60W 30/09*     (2012.01)
*B60W 30/095*    (2012.01)
*G06N 3/04*      (2023.01)
*G06N 3/084*     (2023.01)

(52) U.S. Cl.
CPC ...... *B60W 60/001* (2020.02); *B60W 30/0956* (2013.01); *G06N 3/04* (2013.01); *G06N 3/084* (2013.01); *B60W 30/09* (2013.01); *B60W 2554/4029* (2020.02); *B60W 2554/4044* (2020.02)

(58) Field of Classification Search
None
See application file for complete search history.

(56) References Cited

U.S. PATENT DOCUMENTS

| | | | |
|---|---|---|---|
| 2017/0169326 A1* | 6/2017 | Diamos | G06N 3/088 |
| 2017/0270374 A1 | 9/2017 | Myers et al. | |
| 2019/0278990 A1* | 9/2019 | Mansour | G06K 9/00 |
| 2020/0175691 A1 | 6/2020 | Zhang et al. | |
| 2021/0082128 A1* | 3/2021 | Okada | G06T 7/74 |
| 2022/0189170 A1* | 6/2022 | Zhu | G06V 10/776 |

FOREIGN PATENT DOCUMENTS

EP     3537348 A1     9/2019

OTHER PUBLICATIONS

International Search Report and Written Opinion mailed Jan. 7, 2022 for International application No. PCT/EP2021/075769.

* cited by examiner

*Primary Examiner* — Isaac G Smith
*Assistant Examiner* — Jennifer M Anda (57) ABSTRACT

In one embodiment, a method is provided. The method includes receiving, at an input of a first machine learning model, first input data representing an environment. The method also includes determining, by the first machine learning model, a set of objects within the environment based on the first input data. The method further includes determining, by a second machine learning model, a set of behaviors for a second set of objects. An input of the second machine learning model is coupled to a set of intermediate layers of the first machine learning model. Determining the set of objects and determining the set of behaviors for the second set of objects is performed at least partially simultaneously.

20 Claims, 7 Drawing Sheets

DETECTING OBJECTS AND DETERMINING BEHAVIORS OF OBJECTS

TECHNICAL FIELD

Embodiments of the present disclosure relate generally to machine learning models. More particularly, embodiments of the disclosure relate to detecting objects in an environment and determining behaviors of the objects.

BACKGROUND

As devices become more complex and as more devices operate autonomously (e.g., autonomous vehicles (AVs)), machine learning (ML) models, artificial intelligence (AI) models, etc., are often used to control the operation of these complex and/or autonomous devices. Machine learning models may also be used to generate inferences, actions, decisions, etc., based on data that is received from various devices (e.g., based on sensor data, such as digital images/videos).

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As discussed above, machine learning models are often use to allow devices/machines to operate autonomously. In addition, machine learning models may also be used to generate inferences, actions, decisions, etc., based on data that is received from various devices. Machine learning models may be used in vehicles, such as autonomous vehicles, semi-autonomous vehicles, etc., to control the operations of the vehicles. For example, the machine learning models may be used to detect objects, such as pedestrians and/or predict a behavior of the pedestrian (e.g., predict a direction of movement of the pedestrian). Machine learning models are often combined sequentially. For example, the output of a first learning model for detecting objects may be provided as an input to a second machine learning model for predicting the behaviors of objects. This may increase the amount of time it takes for the machine learning models to detect objects and predict their behaviors. The increased amount of time for detecting objects and predicting their behaviors may reduce the reliability and/or safety of a vehicle. For example, it may take longer for an autonomous vehicle to detect and avoid a pedestrian crossing a road.

Thus, it may be useful to decrease the latency for machine learning models to detect objects and/or predict the behaviors of the objects. The embodiments, implementations, and/or examples, described herein allow the machine learning models to detect objects and predict behaviors simultaneously (e.g., in parallel). By detecting objects and predicting their behaviors, the machine learning models may be able to generate output more quickly to control the operation of the vehicle. This may increase the safety and reliability of the vehicle.

Figure 1:
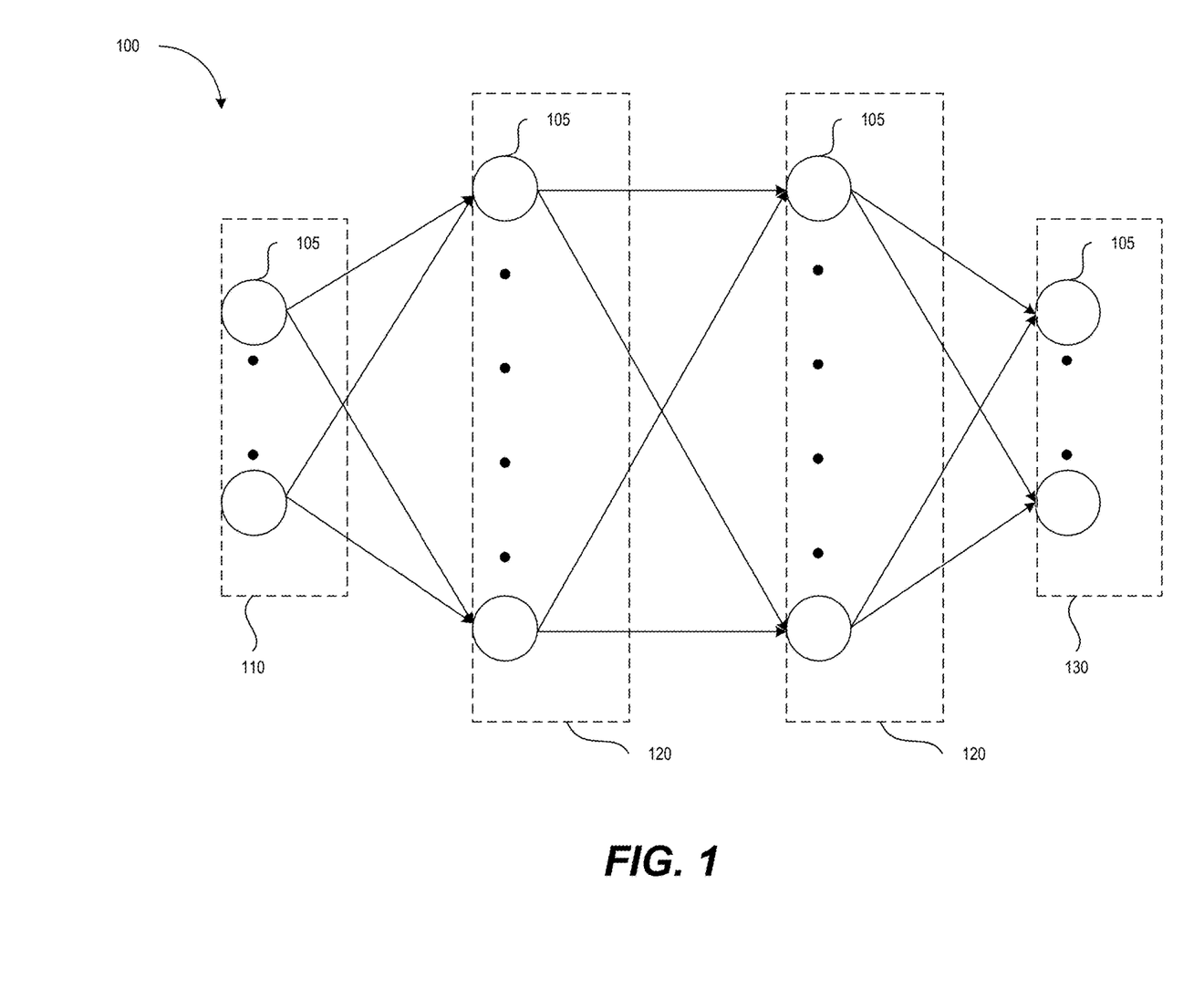
FIG. 1 is a diagram illustrating an example neural network, in accordance with one or more embodiments of the present disclosure.

FIG. 1 is a diagram illustrating an example neural network 100, in accordance with one or more embodiments of the present disclosure. The neural network 100 may be used to model relationships between (e.g., complex) inputs and outputs or to find patterns in data, where the dependency between the inputs and the outputs may not be easily ascertained. The neural network 100 may also be a computing model that may be used to determine a feature in input data through various computations. For example, the neural network 100 may determine a feature (e.g., a number, shape, pattern, etc.) in input data (e.g., audio data, image data, video data, etc.) according to a structure that defines a sequence of computations to be performed.

The neural network 100 may be a convolutional neural network (CNN). A CNN may be a feed forward neural network. A feed forward neural network may be a type of neural network where the connections between the nodes do not form a cycle. For example, the signals, messages, data, information etc., flow forward from the input layer 110 (e.g., from the input nodes), through intermediate layers 120, to the output layer 130 (e.g., to the output nodes) of the neural network 100 from left to right. The signals, messages, data, information etc., may not go backwards through the neural network (e.g., may not go from right to left). A CNN may be used for image analysis. The connections and/or their associated weights may take the form of a convolutional filter (and/or a convolutional kernel) that may be applied to an input (e.g., may be applied to different pixels of an image). Although the present disclosure may refer to image analysis for CNNs, in other embodiments, the CNN may be used for other types of data and inputs.

Figure 2:
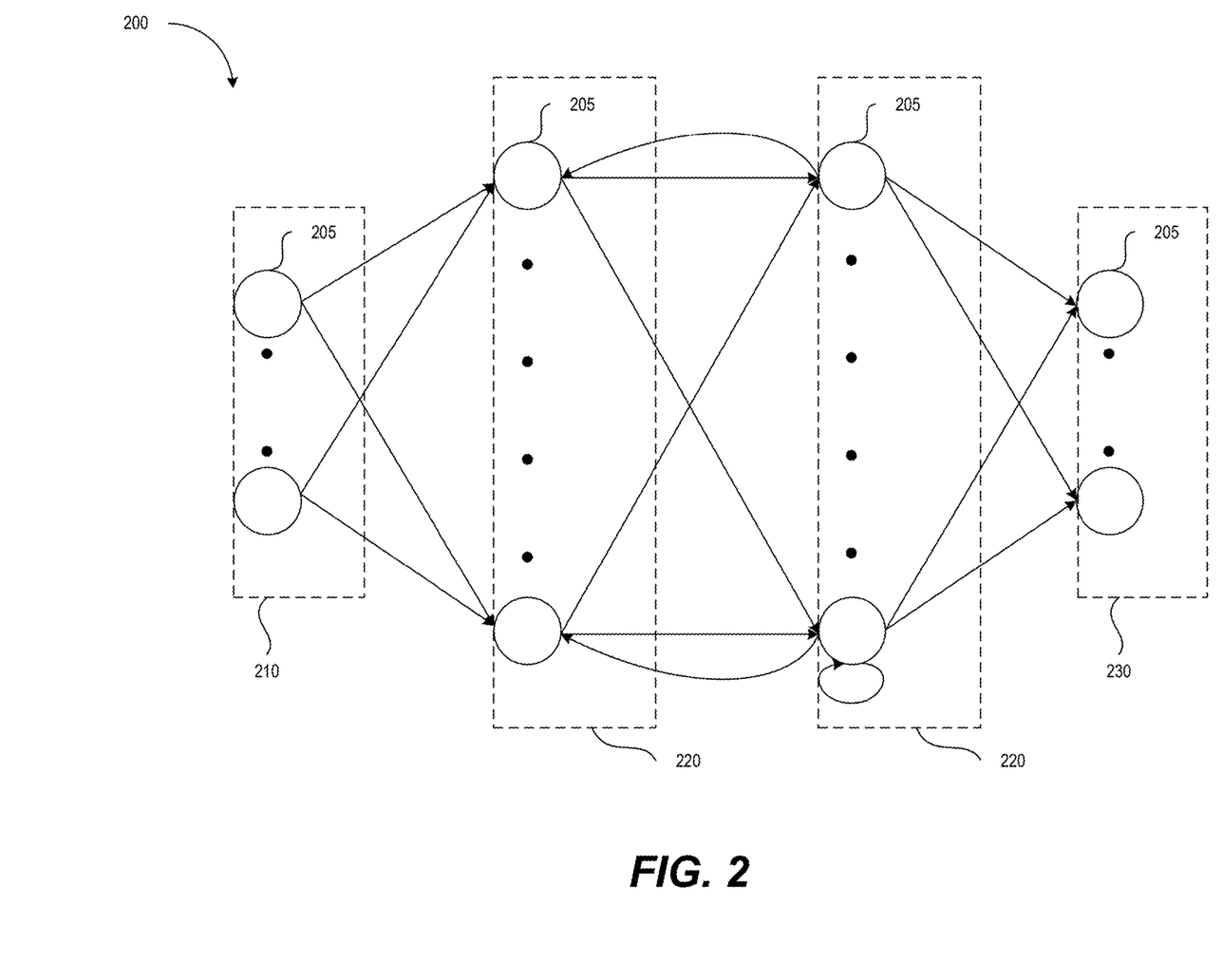
FIG. 2 is a diagram illustrating an example neural network, in accordance with one or more embodiments of the present disclosure.

The neural network 100 includes an input layer 110, intermediate layers 120, and an output layer 130. Each of the input layer 110, the intermediate layers 120, and the output layer 130 includes one or more nodes 105. Each of the input layer 110, the intermediate layers 120, and the output layer 130 may have a different number of nodes 105. The neural network 100 may be a deep neural network (DNN) or a deep CNN. A neural network may be deep (e.g., a deep neural network) if there is more than one intermediate layer 120 (e.g., if there are four, ten, or some other appropriate number of intermediate layers 120). As illustrated in FIG. 2, the neural network 100 includes two intermediate layers 120 (e.g., two columns of nodes 105). In one embodiment, an intermediate layer 120 may include nodes 105 and connections/weights that are coupled to the nodes 105 in the intermediate layer 120. The nodes of an intermediate layer may receive input for the intermediate layer 120 (e.g., an output, such as a feature map, generated by a previous layer). The weights (e.g., a kernel/filter) may be applied to the inputs to generate an output of the current intermediate layer (e.g., a feature map).

Each of the nodes 105 in a layer is connected to either a node 105 in the next level (e.g., next sub-layer) or a node 105 in another layer, as represented by the arrows/lines between the nodes 105. For example, the nodes 105 in the input layer are each coupled to at least one node 105 in the first intermediate layer 120. Neural network 100 may be a fully connected neural network. For example, each node 105 in each layer or level is connected to each node in the subsequent layer or level where there is a subsequent layer or level (e.g., nodes 105 in the output layer 130 are not connected to other nodes).

Each connection may be associated with a weight or weight value (e.g., may have a weight). A weight or weight value may define coefficients applied to the computations. For example, the weights or weight values may be scaling factors between two or more nodes 105. Each node 105 may represent a summation of its inputs, and the weight or weight value associated with a connection may represent a coefficient or a scaling factor multiplied to an output of a node 105 in that connection. The weights between the nodes 105 may be determined, calculated, generated, assigned, learned, etc., during a training process for the neural network. For example, backpropagation may be used to set the weights such that the neural network 100 produces expected output values given corresponding values in labeled training data. Thus, the weights of the intermediate layers 120 can be considered as an encoding of meaningful patterns in the data. The weights of the connections between the nodes 105 may be modified by additional training.

Although neural network 100 is depicted with a particular number of nodes 105 layers, and connections, various neural network architectures/configurations may be used in other embodiments. For example, different fully connected neural networks and partially connected neural networks (e.g., where all nodes in adjacent layers are not connected) may be used.

Although the present disclosure may refer to convolutional neural networks, other types of neural networks and/or deep neural networks may be used in other embodiments. For example, different fully connected neural networks and partially connected neural networks (e.g., where all nodes in adjacent layers are not connected) may be used.

FIG. 2 is a diagram illustrating an example neural network 200, in accordance with one or more embodiments of the present disclosure. The neural network 200 may be used to model relationships between inputs and outputs or to find patterns in data, where the dependency between the inputs and the outputs may not be easily ascertained. The neural network 200 may also be a computing model that may be used to determine a feature in input data through various computations.

In another embodiment, the neural network 200 may be a recurrent neural network (RNN). A RNN may be a neural network where the connections between nodes may form a directed graph. A RNN may be a type of neural network where the connections between the nodes may form a cycle and/or may go in a backwards direction. For example, the signals, messages, data, information etc., may flow both forward (e.g., from left to right) and backwards (e.g., from right to left) between the nodes 205 of the neural network. The RNN may also use memory units, such as long-short-term-memory (LSTM) units, gated recurrent units (GRUs), etc. The GRUs and/or LSTM units may allow the RNN to backpropagate errors through layers (e.g., backwards through the layers or sub-layers) over time. This may allow a RNN to exhibit temporal dynamic behavior. Although the present disclosure may refer to sequence analysis and/or prediction for RNNs, in other embodiments, the RNN may be used for other types of data and inputs.

In one embodiment, the neural network 200 may be a convolutional LSTM neural network (e.g., a ConvLSTM, a ConvLSTM NN, etc.) A convolutional LSTM neural network may be a type of LSTM/RNN that performs a convolution operation within a LSTM unit. This may allow the convolutional LSTM neural network to process additional types of input data, such as video (e.g., digital videos), images, etc.

The neural network 200 includes an input layer 210, an intermediate layer 220, and an output layer 230. Each of the input layer 210, the intermediate layer 220, and the output layer 230 includes one or more nodes 205. Each of the input layer 210, the intermediate layer 220, and the output layer 230 may have a different number of nodes 205. The neural network 200 may be a deep neural network or a deep RNN. A neural network may be deep if the intermediate layer 220 includes multiple levels (e.g., multiple columns of nodes 205, multiple sub-layers of nodes 205). As illustrated in FIG. 2, the neural network 200 includes two levels (or sub-layers) of nodes 205 (e.g., two columns of nodes 205). A RNN may be used for sequence analysis and/or prediction. For example, the RNN may recognize patterns in sequences of data, such as handwriting, text, numerical time series data, etc. This Each of the nodes 205 in a layer is connected to at least one other node, as represented by the arrows/lines between the nodes 205. Each connection may be associated with a weight or weight value (e.g., may have a weight). A weight or weight value may define coefficients applied to the computations. Each node 205 may represent a summation of its inputs, and the weight or weight value associated with a connection may represent a coefficient or a scaling factor multiplied to an output of a node 205 in that connection. The weights between the nodes 205 may be determined, calculated, generated, assigned, learned, etc., during a training process for the neural network. Thus, the weights of the intermediate layers can be considered as an encoding of meaningful patterns in the data. The weights of the connections between the nodes 205 may be modified by additional training.

Although neural network 200 is depicted with a particular number of nodes 205, layers, and connections, various neural network architectures/configurations may be used in other embodiments. For example, different fully connected neural networks and partially connected neural networks (e.g., where all nodes in adjacent layers are not connected) may be used.

Figure 3:
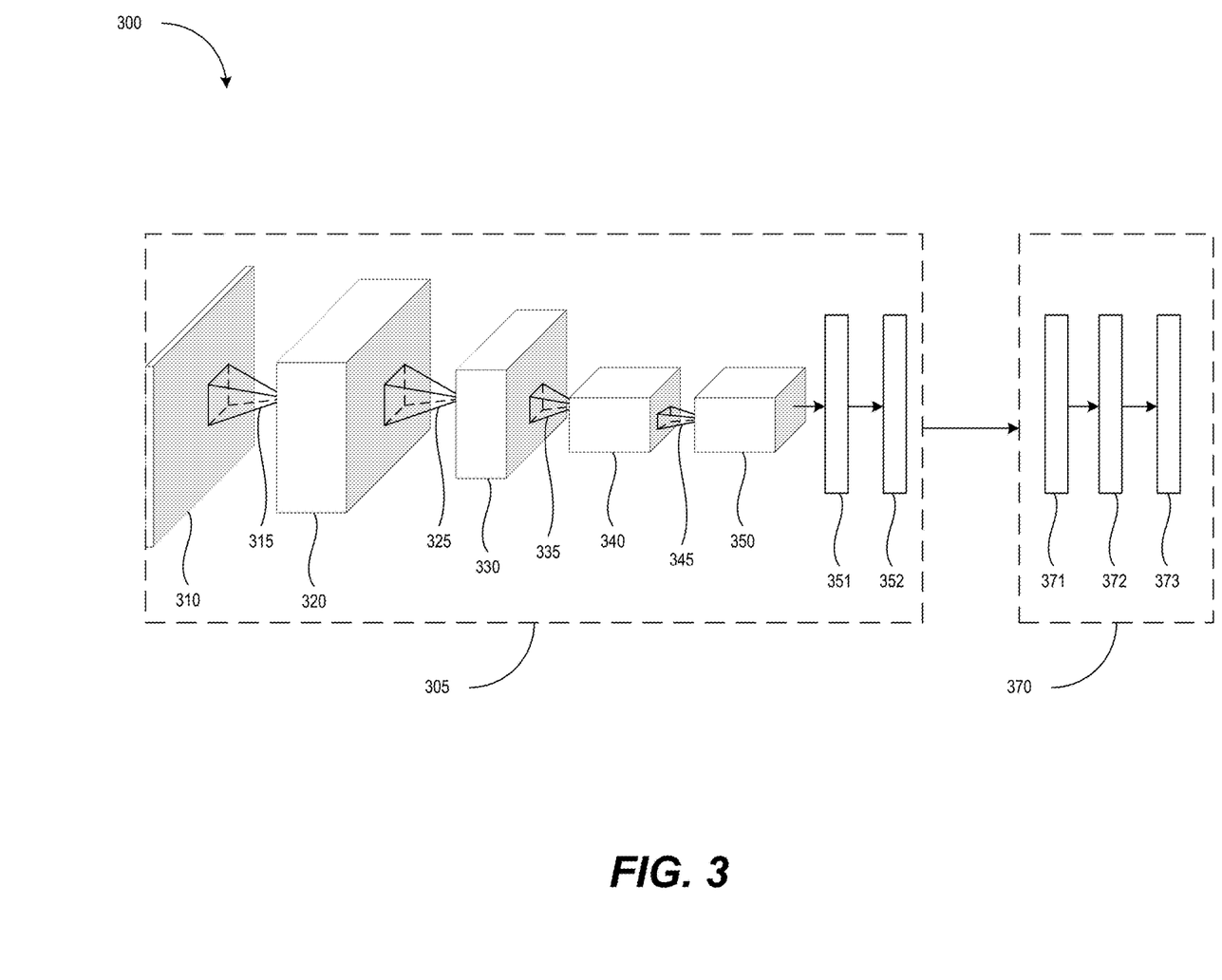
FIG. 3 is a block diagram illustrating an example perception/prediction system, in accordance with one or more embodiments of the present disclosure.

FIG. 3 is a diagram illustrating an example perception/prediction system 300, in accordance with one or more embodiments of the present disclosure. The perception/prediction system 300 includes machine learning model 305 and machine learning model 370. In one embodiment, the machine learning model 305 may be a convolutional neural network (CNN) which may be a type/class of deep neural network. The machine learning model 305 (e.g., a CNN) may use convolution and pooling operations to process inputs and generate and output, such as an inference, decision, etc. A CNN may often be used to perform image analysis and/or processing. The machine learning model 305 may also be referred to as a deep neural network or a deep network. A deep neural network may be a neural network that includes multiple intermediate layers (e.g., multiple layers of nodes and/or weights/connections between the nodes).

As illustrated in FIG. 3, an input 310 may be provided to (e.g., passed into, fed into, etc.) the machine learning model 305. For example, the input 310 may include one or more images (e.g., digital images, pictures, etc.) that will be processed and/or analyzed by the machine learning model 305. The input 310 may be processed by a first filter 315. The first filter 315 may also be referred to as a convolutional filter. A convolutional filter may include one or more kernels (e.g., convolutional kernels). For example, an input (e.g., an image) may have multiple channels (e.g., multiple input channels, such as a red, blue, green, input channel for each pixel of an image). The first filter 315 may include a filter for each channel. The first filter 315 may be used to perform a convolution operation on the input 310. The convolution operation may be a may refer to an operation that may merge two sets of information into an output. For example, the first filter 315 may include weights (e.g., values) that may be applied to portions of the input to generate an output. The first filter 315 may also be referred to as a layer (e.g., an intermediate layer) of the machine learning model 305.

In one embodiment, the output generated by the first filter 315 may be a feature map 320. The feature map 320 may be the result of applying the first filter 315 (e.g., a set of weights) to the values of the input. For example, the feature map 320 may be the result of element-wise matrix multiplications and a sum of the result.

In one embodiment, the machine learning model 305 may also include and/or perform pooling operations that may be performed on the feature map 320. The pooling operation may refer to down-sampling a feature map, to reduce the height and weight of the feature map 320, while retaining the same depth. For example, max-pooling (e.g., a type of pooling which may user the maximum value in a pooling window) may be applied to the feature map 320. The feature map 320 may be the output of the first filter 315 (e.g., the output of a first layer) and may also be the input provided to the second filter 325 (e.g., the input of a second, subsequent layer).

The second filter 325 may receive the feature map 320 (e.g., an input feature map) and may apply a convolution operation to the feature map 320 to generate the feature map 330. One or more pooling operations may be performed on the feature map 330, as discussed above. The feature map 330 may be the output of the second filter 325 (e.g., the output of one layer) and may also be the input provided to the third filter 335 (e.g., the input of another, subsequent layer). The third filter 335 may receive the feature map 330 (e.g., an input feature map) and may apply a convolution operation to the feature map 330 to generate the feature map 340. One or more pooling operations may be performed on the feature map 340, as discussed above. The feature map 340 may be the output of the third filter 335 (e.g., the output of one layer) and may also be the input provided to the fourth filter 345 (e.g., the input of another, subsequent layer).

The fourth 345 may receive the feature map 340 (e.g., an input feature map) and may apply a convolution operation to the feature map 340 to generate the feature map 350. One or more pooling operations may be performed on the feature map 350, as discussed above. The feature map 350 may be the output of the fourth filter 345 (e.g., the output of one layer) and may also be the input provided to the fully connected layer 351.

As illustrated in FIG. 3, the machine learning model 305 also includes fully connected layers 351 and 352. In one embodiment, the fully connected layers 351 and 352 may use the outputs of the previous layers (e.g., the feature maps 320, 330, 340, and/or 350, which may be referred to as intermediate outputs, intermediate layer outputs, etc.) and may generate the final output (e.g., the final inference, decisions, etc.) of the machine learning model 305.

In one embodiment, the machine learning model 370 may determine (e.g., predict) one or more behaviors of one or more objects within the environment. The machine learning model 370 includes layers 371, 372, and 373. The machine learning model 370 may be a RNN (e.g., a neural network where the connections between nodes may form a directed graph). Machine learning model 370 may also use memory units, such as LSTM units and GRUs. The GRUs and/or LSTM units may allow the machine learning model 370 to backpropagate errors through layers (e.g., backwards through the layers or sub-layers) over time. This may allow a machine learning model 370 to exhibit temporal dynamic behavior. In one embodiment, the machine learning model 370 may be a convolutional LSTM neural network (e.g., a type of LSTM/RNN that performs a convolution operation within a LSTM unit).

As illustrated in FIG. 3, the machine learning model 305 and the machine learning model 370 may operate sequentially. For example, the machine learning model 305 may receive inputs and/or input data (e.g., a digital image, a digital video, etc.) at time T0. The input may be passed through the filters 315, 325, 335, and 345 (to generate feature maps 320, 330, 340, and 350), and the fully connected layers 351. The output of the machine learning model 305 may be generated at time T5. For example, the machine learning model 370 may generate a list of locations/coordinates (e.g., a starting location within an image and a height/width) for one or more objects that were detected in the inputs/input data. The machine learning model 370 may not begin to determine (e.g., predict) the one or more behaviors of the one or more objects until after time T5 because the machine learning model 370 uses the outputs of the machine learning model 305 to determine the one or more behaviors of the objects. The machine learning model 370 may receive, as an input, the set of objects detected by the machine learning model 305 and may generate an output (e.g., a set of behaviors) at time T9. This results in a higher latency (e.g., more delay, more time, etc.) for the perception/prediction system 300 to identify (e.g., perceive) an object and predict a behavior for the object. The higher latency may of the perception/prediction system 300 may increase the amount of time for an autonomous vehicle to react to objects in an environment.

In addition, because the machine learning model 305 and the machine learning model 370 operate sequentially, the may also be trained separately. For example, a first set of training data may be used to train the machine learning model 305 and a second, different set of training data may be used to train the machine learning model 370. Because two sets of training data may be used, the amount of time for training the machine learning model 305 and the machine learning model 370 may be increased.

Figure 4:
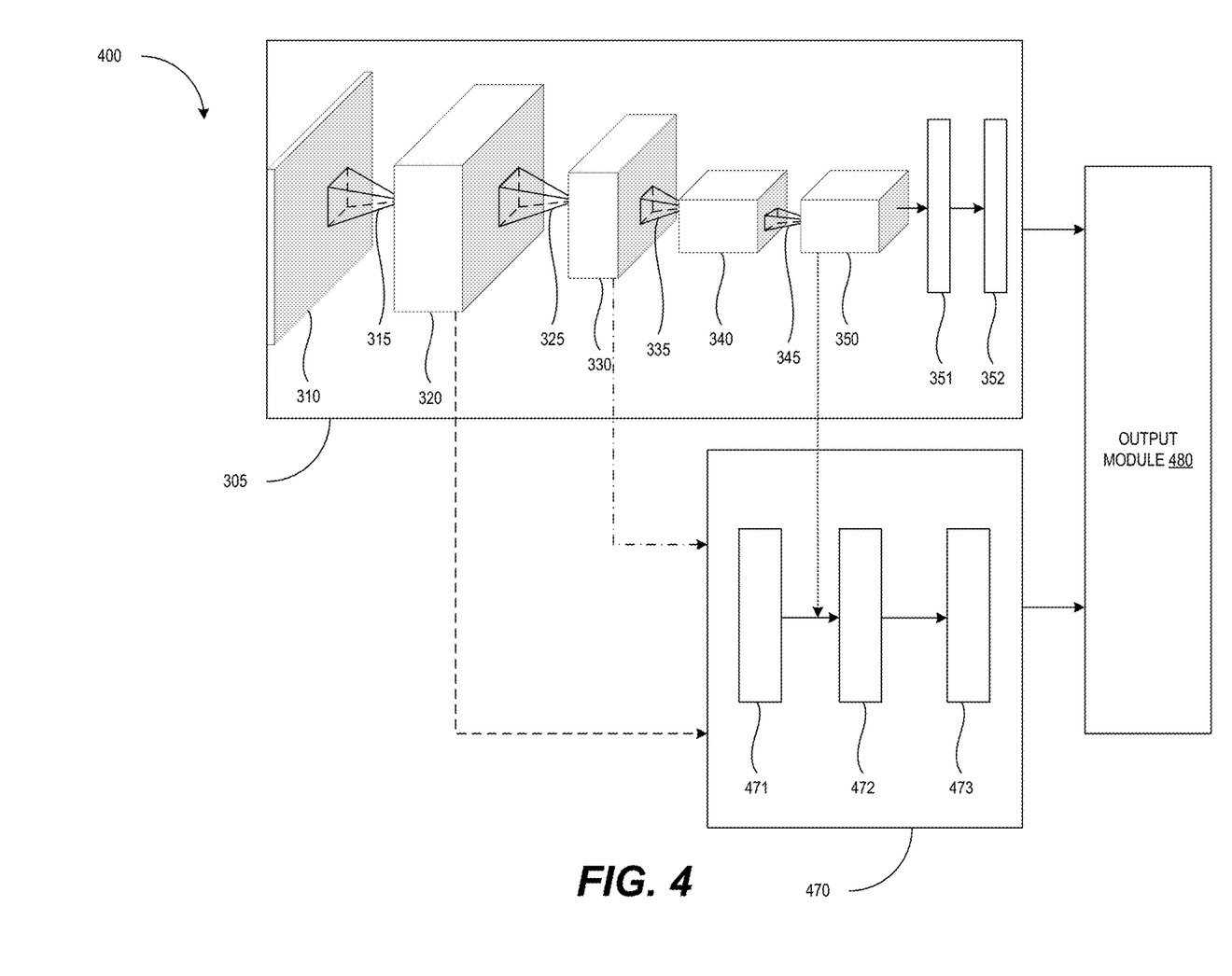
FIG. 4 is a block diagram illustrating an example perception/prediction system, in accordance with one or more embodiments of the present disclosure.

FIG. 4 is a diagram illustrating an example perception/prediction system 400, in accordance with one or more embodiments of the present disclosure. The perception/prediction system 400 includes a machine learning model 305, a machine learning model 470, and an output module 480. In one embodiment, the machine learning model 305 may be a CNN (as discussed above) and the machine learning model 470 may be a RNN, such as a LSTM network, a convolutional LSTM network, etc. The perception/prediction system 400 may be located on one or more computing devices and/or virtual environments (e.g., virtual machines, containers, etc.). For example, the machine learning model 305, the machine learning model 470, and the output module 480 may be located on a single computing device and/or may be distributed across multiple computing devices (the machine learning model 305 is on a first computing device, the machine learning model 470 is on a second computing device, etc.).

In one embodiment, the machine learning model 305 may receive input 310 (e.g., input data such as digital video, digital images, etc.). For example, the input 310 may be received via one or more input nodes, an input layer, etc. The input 310 (e.g., the input data) may generated, capture, obtained, etc., by various sensors of a vehicle (e.g., an autonomous vehicle, a semi-autonomous vehicle, etc.). For example, the input 310 may be generated by a camera, a LIDAR device/sensor, etc., of the vehicle. The input 310 may represent an environment where the vehicle is located. For example, the input 310 may represent, depict, etc., objects (e.g., pedestrians, other vehicles, bicyclists, etc.), traffic control devices (e.g., stop lights, signs, lane markers/markings, crosswalks, etc.), sidewalks, lanes/streets, vegetation (e.g., trees, bushes, shrubs, etc.), buildings, parking lots, etc., that may be in the environment.

In one embodiment, the machine learning model 305 may perceive the environment where the vehicle is located, based on the input 310. For example, the machine learning model 305 may perceive (e.g., sense, detect, identify, etc.) objects (e.g., pedestrians, other vehicles, bicyclists, etc.), traffic control devices (e.g., stop lights, signs, lane markers/markings, crosswalks, etc.), sidewalks, lanes/streets, vegetation (e.g., trees, bushes, shrubs, etc.), buildings, parking lots, etc., that may be in the environment. The machine learning model 305 may determine (e.g., identify, detects, etc.) a first set of objects (e.g., one or more objects) that are located within the environment based on the input 310 (e.g., based on digital images, digital video, LIDAR data, etc.). For example, the machine learning model 305 may detect one or more pedestrians that are located within the environment with the vehicle.

In one embodiment, the machine learning model 470 may determine a set of behaviors (e.g., one or more behaviors) for the set of objects detected by the machine learning model 305. For example, the machine learning model 470 may determine whether an object will move. In another example, the machine learning model 470 may determine a direction of movement for an object (e.g., left, right, up down, diagonal, etc.).

In one embodiment, the machine learning model 305 may determine (e.g., identify, detect, etc.). one or more objects and the machine learning model 470 may determine (e.g., identify, detect, predict, etc.) one or more behaviors, at least partially simultaneously. For example, the machine learning model 305 may receive the input 310 at time T0 and may generate an output identifying one or more objects at time T5. The machine learning model 470 may receive the outputs generated by one or more intermediate layers of the machine learning model and may begin determining the one or more behaviors at a time that is between T0 and T5s. In some embodiments, the machine learning model 305 and the machine learning model 470 may generate outputs simultaneously. For example, the machine learning model 305 may generate an output indicating a set of objects and the machine learning model 470 may generate an output indicate a set of behaviors at substantially the same time (e.g., both the machine learning model 305 and the machine learning model 370 may generate their respective outputs at time T5).

As illustrated in FIG. 4, the machine learning model 470 may be coupled to a set of intermediate layers (e.g., one or more intermediate layers) of the machine learning model 305. In one embodiment, an input of the machine learning model 470 (e.g., the left side of the machine learning model 470) may be coupled to an intermediate layer of the machine learning model 305. For example, the filter 315 (e.g., a layer) may generate the feature map 320 (e.g., may generate an output). The feature map 320 may be provided to the input of the machine learning model 470, as indicated by the dashed line.

In other embodiments, the input of the machine learning model 470 (e.g., the left side of the machine learning model 470) may be coupled to multiple intermediate layers of the machine learning model 305. For example, the filter 315 (e.g., a layer) may generate the feature map 320 (e.g., may generate an output) and the filter 325 may generate the features map 330. The feature map 320 may be provided to the input of the machine learning model 470, as indicated by the dashed line. The feature map 330 may be provided to the input of the machine learning model 470 as indicated by the dashed-dotted line.

In one embodiment, one or more intermediate layers of the machine learning model 470 may be coupled to one or more intermediate layers of the machine learning model 305. For example, the filter 345 may generate the feature map 350. The feature map 350 may be provided as an input to layer 472 (e.g., an intermediate layer) of the machine learning model 470, along with the output of layer 471.

In one embodiment, the machine learning model 305 may generate multiple intermediate outputs (e.g., feature maps) over a period of time. For example, the input 310 may be digital video which may include multiple frame (e.g., digital image). Each frame may be provided to the machine learning model 305 and each of the filters may generate different feature maps for the multiple frames. For example, at time T1 the filter 315 may generate a first feature map based on a first frame of the digital video, at time T2 the filter 315 may generate a second feature map based on a second frame of the digital video, and at time T3 the filter 315 may generate a third feature map based on a third frame of the digital video. The first, second and third feature maps (generated at times T1, T2, and T3, respectively) may be provided as an input to the machine learning model 470. For example, the first, second and third feature maps may be collected together and provided as an input to the machine learning model 470 simultaneously.

In one embodiment, multiple sets of intermediate outputs generated by different layers at different times may be provided to the machine learning model 470. For example, the filter 315 may generate a first set of intermediate outputs (e.g., feature maps generated at times T1, T2, and T3) and the filter 325 may generate a second set of intermediate outputs (e.g., feature maps generated at times T1, T2, and T3). The first and second set of intermediate outputs may be provided to the machine learning model 470.

In one embodiment, the output module 480 may receive a first output generated by the machine learning model 305 and a second output generated by the machine learning model 470. For example, the output module 480 may receive the first output and the second output simultaneously. The first output may indicate a first set of objects that were identified, detected, etc., by the machine learning model 305. The second output may indicate a set of behaviors (e.g., a set of predicted behaviors, a set of predictions, etc.) for the set of objects detected by the machine learning model 305. The output module 480 may identify matches, correlations, associations, etc., between the first set of objects and the set of behaviors. For example, the machine learning model 470 may determine movement (e.g., behaviors) may occur at various locations within an image (e.g., the input). the output module 480 may identify behaviors at locations that match the locations of objects (within the image) were detected by the machine learning model 305. The output module 480 may select, identify, determine, etc., the behaviors from locations that correspond to the locations of the set of objects detected by the machine learning model 305, from the set of behaviors. For example, if the first set of objects includes four objects at four locations, and the machine learning model determines that a movement may occur at five locations, four of which match the four locations of the four objects, the output module 480 may select, identify, determine, the behaviors that were determined (e.g., predicted) for objects at the four matching locations.

In one embodiment, the machine learning model 305 may not be modifiable, changeable, etc. For example, the machine learning model 305 may be a grey box machine learning model. A grey box machine learning model may allow modules, components, etc., outside of the grey box machine learning model to access the intermediate outputs generated by the intermediate layers of the grey box machine learning model. The grey box machine learning model may not allow the filters (e.g., the weights) of the grey box machine learning model to be modified.

In one embodiment, the machine learning model 305 may be modifiable, changeable, etc. For example, the machine learning model 305 may be a white box machine learning model. A white box machine learning model may allow modules, components, etc., outside of the grey box machine learning model to access the intermediate outputs generated by the intermediate layers of the grey box machine learning model. The white box machine learning model may further allow the filters (e.g., the weights) of the white box machine learning model to be modified. For example, the white box machine learning model may allow the filters of the white box machine learning model to be modified via training and/or re-training (e.g., by passing training data to the white box machine learning model).

In one embodiment, the machine learning model 305 and the machine learning model 470 may be trained simultaneously using a single set of training data. As illustrated in FIG. 4, the machine learning model 470 may receive the input 310 that is provided to the machine learning model 305. The machine learning model 470 may not directly receive the training data that may be used to train the machine learning model 305. However, the machine learning model 470 uses intermediate outputs generated by intermediate layers of the machine learning model 305, as discussed above. Thus, as the machine learning model 305 is trained using the training data, the machine learning model 470 will be trained using the intermediate outputs generated by the machine learning model 305 as the machine learning model 305 processes the training data. This may allow the machine learning module 470 to be trained without receiving the training data directly.

In one embodiment, the machine learning model 470 may also determine one or more attributes (e.g., characteristics, features, traits, etc.) of one or more objects. For example, the machine learning model 470 may determine the gender, height, weight, hair color, etc., of a pedestrian in the environment. In another example, the machine learning model 470 may determine a direction that a pedestrian may be facing/looking. In a further example, the machine learning model 470 may determine the color of one or more stoplights in the environment.

As discussed above, the machine learning model 305 and the machine learning model 470 may generate their respective outputs simultaneously. For example, both the machine learning model 305 and the machine learning model 470 may generate their respective outputs at time T5, rather than at time T9, as discussed above in FIG. 3. This may allow the perception/prediction system 400 to detect objects and/or predict behaviors of the objects more quickly because the machine learning model 470 and machine learning model 305 are operating simultaneously. Decreasing the latency of the perception/prediction system 400 to detect objects and/or predict behaviors of the objects may allow the vehicle to react more quickly to objects, and to operate more quickly, efficiently, and/or safely.

In addition, the perception/prediction system 400 may be able to provide more accurate predictions of an objects behavior when compared to the perception/prediction system 300. The machine learning model 370 of the perception/prediction system 300 (illustrated in FIG. 3) uses the objects (e.g., pedestrians) detected by the machine learning model 305 as an input. For example, the machine learning model 370 may receive the portions of an image that depict an object, rather than the full image (e.g., a cropped out portion of the image that depicts the object, rather than the whole image). Thus, the machine learning model 370 may be unable to use features that may be present in other portions of the full image. For example, the machine learning model 370 may not be able to identify a correlation between the color of a traffic light and the predicted behavior of a pedestrian because the machine learning model 370 may only be provided the portion of the image that includes the pedestrian and may not be provided the other portion of the image that includes the traffic light. Because the machine learning model 470 of the perception/prediction system 400 is using the features maps generated based on the full image, the machine learning model 470 may be able to identify correlations between multiple objects in the environment and may be able to more accurately predict the behavior of a particular object. For example, if both a pedestrian and a stoplight are detected, and the machine learning model 470 is able to determine that the stoplight is red, it is more likely that the pedestrian will not move (e.g., will not cross a street) because of the red stoplight.

Furthermore, because the machine learning model 305 and the machine learning model 470 operate simultaneously, the machine learning model 305 and the machine learning model 470 may be trained simultaneously. For example, the set of training data may be provided to the machine learning model 305. As the machine learning model 305 processes the training data, the feature sets generated during the training of the machine learning model 305 may be simultaneously provided to the machine learning model 470 to train the machine learning model 470. This reduces the amount of time to train the machine learning model 305 and the machine learning model 470.

Although the machine learning model 305 and the machine learning model 470 are discussed with respect to detecting objects and predicting behaviors of objects. The machine learning model 305 and the machine learning model 470 may perform other functions and/or determine other predictions in other embodiments.

Figure 5:
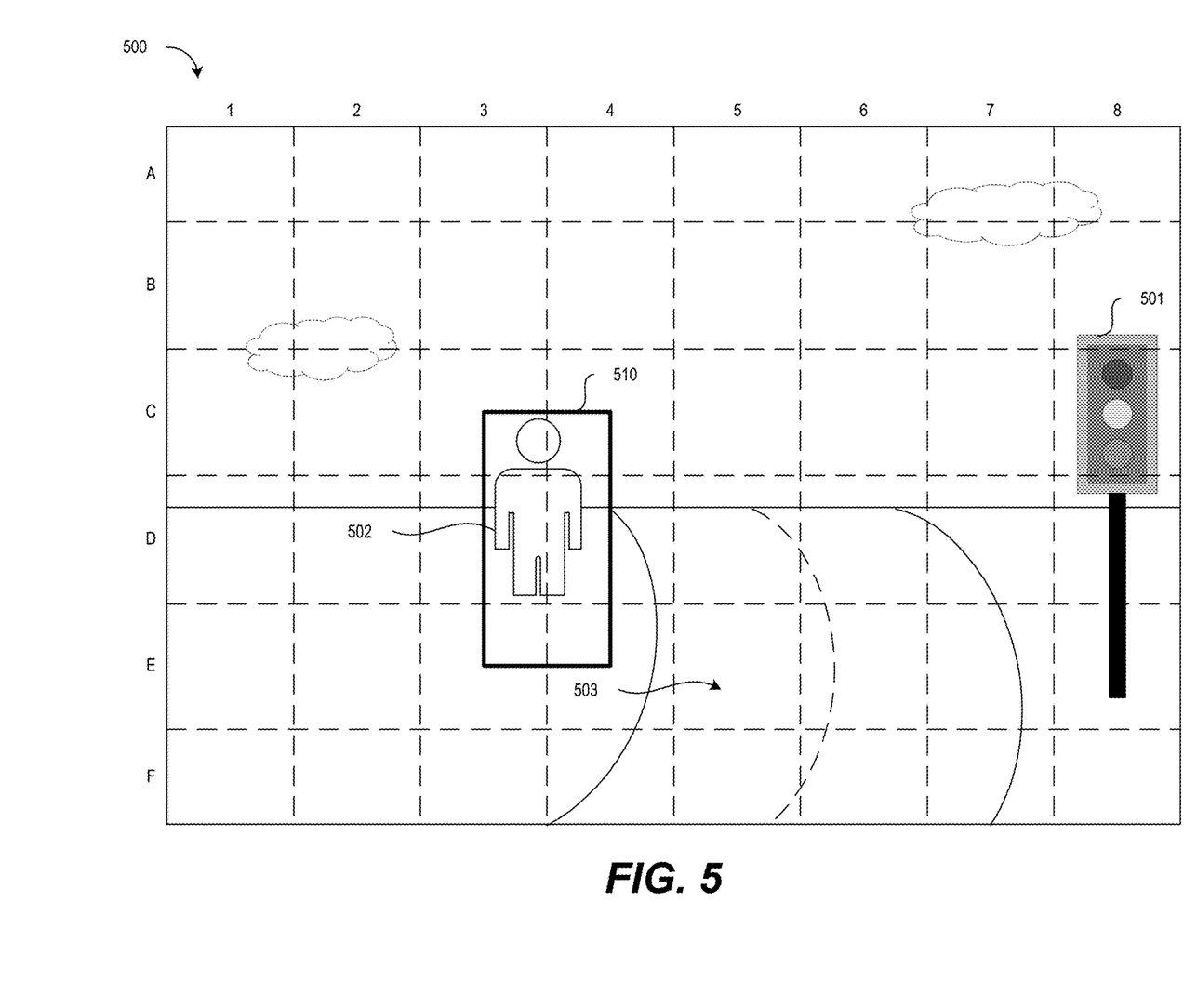
FIG. 5 is a diagram illustrating an example image, in accordance with one or more embodiments of the present disclosure.

FIG. 5 is a diagram illustrating an example image 500, in accordance with one or more embodiments of the present disclosure. The image 500 is divided into a grid, with columns 1 through 8 and rows A through F. Each grid may be referred to by a row-column pair. For example, A1 may refer to the top-most and left-most grid. The image 500 depicts, represents, etc., an environment where a vehicle may be moving and/or located. The image 500 depicts a stoplight 501, a pedestrian 502, and a road 503.

In one embodiment, referring back to FIG. 4, the image 500 may be the output generated by the machine learning model 305 of the perception/prediction system 400. As discussed above, machine learning model 305 may detect one or more objects in the image 500. In particular, the machine learning model 305 may detect the pedestrian 502. The image 500 (e.g., the output) may have the shape/dimensions H×W×Anch×5. H represents the height of the image 500 in terms of the number of grids (e.g., H=6). W represent presents the width of the image 500 in terms of the number of grids (e.g., W=8). Anch may represent the number of anchor boxes that each grid may have to detect objects (e.g., pedestrians). The fourth dimension may indicate five values, the first value may be a probability that an object (e.g., a pedestrian) will move in a certain direction and the other four values may the corners of the bounding box 510.

In one embodiment, the image 500 may be the output generated by the machine learning model 470 of the perception/prediction system 400. As discussed above, machine learning model 470 may determine one or more behaviors for one or more objects in the image 500. The image 500 (e.g., the output) may have the shape/dimensions H×W×Anch×5. H represents the height of the image 500 in terms of the number of grids (e.g., H=6). W represent presents the width of the image 500 in terms of the number of grids (e.g., W=8). Anch may represent the number of anchor boxes that each grid may have to detect objects (e.g., pedestrians). The fourth dimension may indicate five values, the first value may indicate a probability that a first object (e.g., the pedestrian) will move in a certain direction. The first value may also indicate the one or more probabilities of whether the first object is a certain type of object. For example, the first value may also indicate a probability that the object is a pedestrian, a probability that the object is a bicyclist, a probability that the object is another vehicle, etc. The values two through five may the corners of the bounding box 510.

As discussed above, the output module 480 may receive both the outputs generated by the machine learning model 305 and the machine learning model 470, respectively.

The output module 480 may identify matches between the locations of the objects detected by the machine learning model 305 and the locations of movements detected by the machine learning model 470. For example, the output module 480 may identify the pedestrian 502 as the matching object. The output module 480 may use the predicted behavior for the pedestrian 502 and may generate an output indicating that the pedestrian 502 located within the bounding box 510 may move in a certain direction (e.g., may move towards the right).

Figure 6:
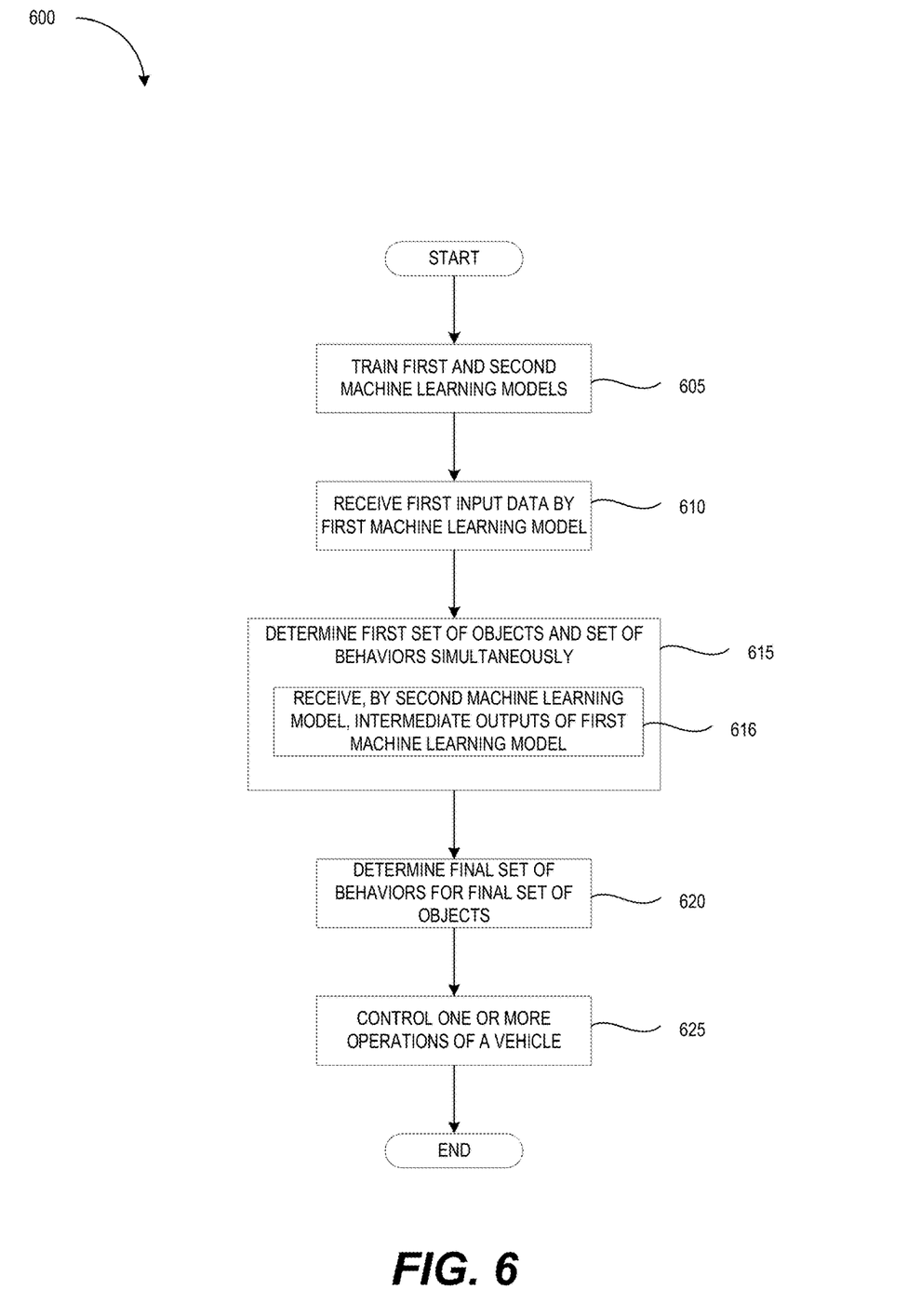
FIG. 6 is a flow diagram illustrating an example process for detecting objects and/or determining behaviors for the objects, in accordance with one or more embodiments of the present disclosure.

FIG. 6 is a flow diagram illustrating an example process 600 for detecting objects and/or determining behaviors for the objects, in accordance with one or more embodiments of the present disclosure. Process 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 600 may be performed by one or more of a computing device, a perception/prediction system (e.g., perception/prediction system 400 illustrated in FIG. 4), a machine learning model (e.g., machine learning models 305 and 470 illustrated in FIG. 4), and/or an output module (e.g., output module 480 illustrated in FIG. 4s).

With reference to FIG. 6, process 600 illustrates example functions used by various embodiments. Although specific function blocks ("blocks") are disclosed in process 600, such blocks are examples. That is, embodiments are well suited to performing various other blocks or variations of the blocks recited in process 600. It is appreciated that the blocks in process 600 may be performed in an order different than presented, and that not all of the blocks in process 600 may be performed. In addition, additional other blocks (not illustrated in FIG. 6) may be inserted between the blocks illustrated in FIG. 6.

The process 600 begins at block 605 where the process 600 may optionally train the first and second machine learning models. The input and/or other layers of the second machine learning model may be coupled to intermediate layers of the first machine learning model, as discussed above. This may allow the first and second machine learning models to be train simultaneously. At block 610, the process 600 may receive, at an input node/layer of the first machine learning model, input data, such as images, videos, etc.

At block 615, the process 600 may determine (e.g., detect, identify, etc.) a set of objects and may determine (e.g., predict, identify, etc.) a set of behaviors for the set of objects, at least partially simultaneously, as discussed above. The block 615, includes block 616. At block 616, the second machine learning model may receive intermediate outputs generated by intermediate layers of the first machine model, as discussed above. At block 620, the process 600 may determine a final set of behaviors for the set of objects. For example, the first machine learning model may detect a first set of objects. The second machine learning model may determine that movement may occur at various locations. The process 600 may identify locations of movements (e.g., behaviors) that match the locations objects were detected by the first machine learning model. The locations of the movements that match the locations of the detected objects may be the final set of behaviors.

At block 625, the process 600 may control one or more operations of a vehicle (e.g., an autonomous vehicle, a semi-autonomous vehicle, etc.). For example, the process 600 may control one or more operations of the vehicle and/or control the vehicle based on the set of objects and the set of behaviors determined by the first and second machine learning model, respectively. The process 600 may control various components, systems, modules, circuits, etc., of the vehicle. For example, the process 600 may control the engine, transmission, brakes/braking system, headlights, horn, steering system etc., of the vehicle based on the set of objects and the set of behaviors. Controlling the various components, systems, modules, circuits, etc., of the vehicle may allow the process 600 to control the movement and/or operation of the vehicle. For example, the process 600 may control one or more of the brakes, steering system, and engine to prevent the vehicle from hitting a pedestrian (e.g., an object) detected by the first machine learning model.

Figure 7:
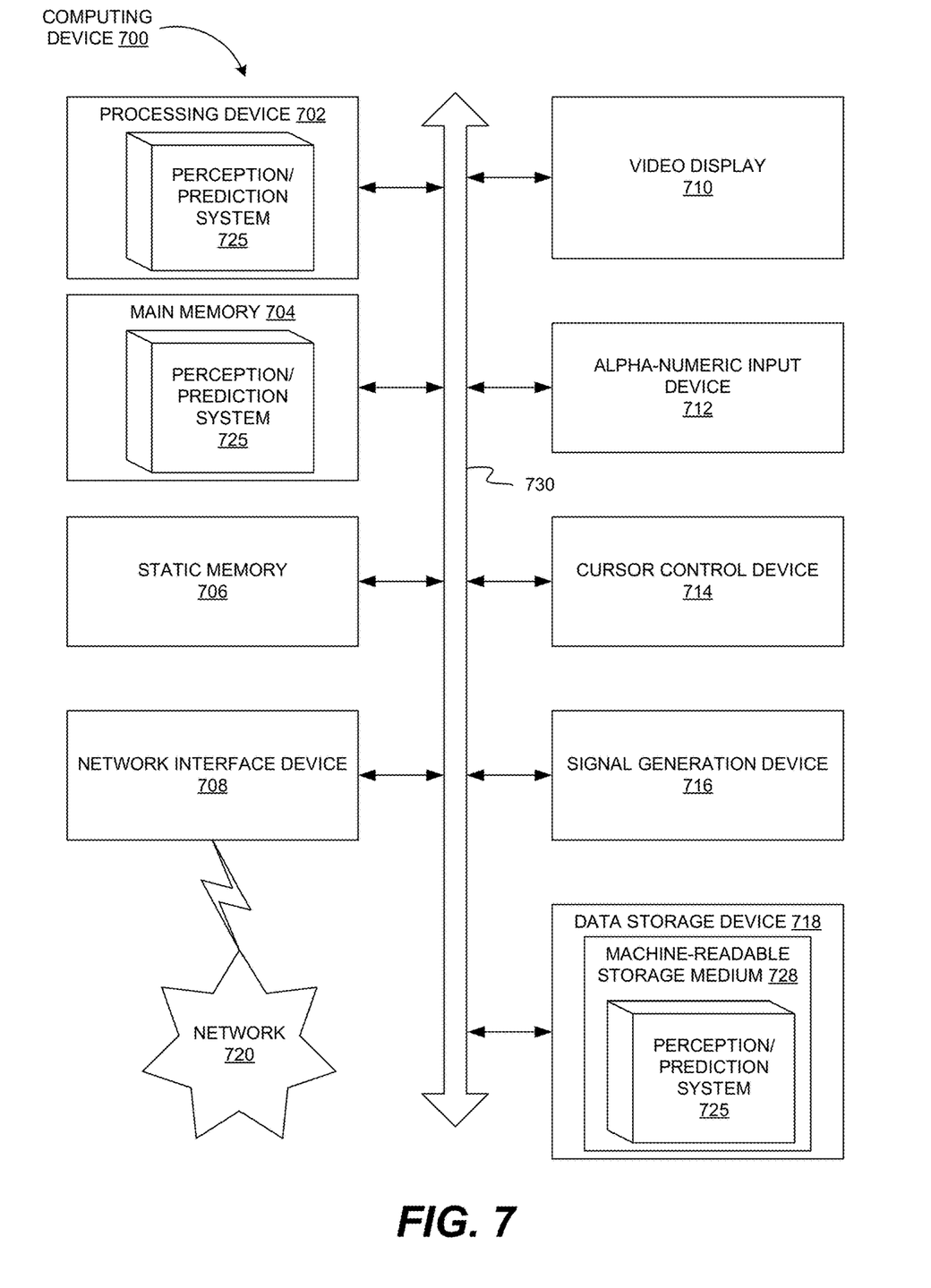
FIG. 7 is a block diagram illustrating an example computing device, in accordance with one or more embodiments of the present disclosure.

FIG. 7 is a block diagram of an example computing device 700, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a programmable logic device (PLD), etc.) 702, a main memory 704 (e.g., synchronous dynamic random access memory (DRAM), read-only memory (ROM)), a static memory 706 (e.g., flash memory), and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of perception/prediction system instructions 725, e.g., instructions for carrying out the operations described herein, in accordance with one or more aspects of the present disclosure. Perception/prediction system instructions 725 may also reside, completely or at least partially, within main memory 704 and/or within processing device 702 during execution thereof by computing device 700, main memory 704 and processing device 702 also constituting computer-readable media. The perception/prediction system instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Additional examples, implementations, embodiments, etc., are described in APPENDIX A, which is hereby incorporated by reference in its entirety.

Unless specifically stated otherwise, terms such as "receiving," "determining," "training," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving, at an input of a first machine learning model, first input data representing an environment;
   determining, by the first machine learning model, a set of objects within the environment based on the first input data;
   determining, by a second machine learning model, a set of behaviors for the set of objects, wherein:
      an input of the second machine learning model is coupled to a set of intermediate layers of the first machine learning model;
      a first intermediate layer of the first machine learning model is coupled to a second intermediate layer of the second machine learning model; and
      determining the set of objects and determining the set of behaviors for the set of objects is performed at least partially simultaneously;
   matching locations of the set of objects with locations of the set of behaviors; and
   controlling one or more operations of a vehicle based on one or more of the set of objects and the set of behaviors.

2. The method of claim 1, further comprising:
   receiving, at the input of the second machine learning model, a set of intermediate outputs from the set of intermediate layers of the first machine learning model.

3. The method of claim 2, wherein each intermediate output of the set of intermediate outputs is received from a different intermediate layer of the first machine learning model.

4. The method of claim 2, wherein each intermediate output of the set of intermediate outputs is generated by a same intermediate layer of the first machine learning model at different times.

5. The method of claim 2, wherein different subsets of the set of intermediate outputs are generated by different intermediate layers at different times.

6. The method of claim 2, wherein:
   the set of intermediate outputs comprises one or more feature maps generated by one or more filters of the set of intermediate layers.

7. The method of claim 1, further comprising:
   training the first machine learning model and the second machine learning model based on a set of training data, wherein the second machine learning model is trained without receiving the set of training data at the input of the second machine learning model.

8. The method of claim 1, wherein:
   the first set of objects within the environment comprises one or more pedestrians within the environment; and
   the set of behaviors comprises one or more directions of movement of the one or more pedestrians.

9. The method of claim 1, wherein the second machine learning model is further to determine a set of attributes of the first set of objects.

10. The method of claim 1, wherein a total number of the locations of the set of objects is different than a total number of the locations of the set of behaviors.

11. The method of claim 1, wherein the method further comprises:
   generating an output based on one or more matches identified during the matching.

12. An apparatus, comprising:
a memory configured to store data; and
a processing device coupled to the memory, the processing device configured to:
- receive, at an input of a first machine learning model, first input data representing an environment;
- determine, by the first machine learning model, a set of objects within the environment based on the first input data;
- determine, by a second machine learning model, a set of behaviors for the set of objects, wherein:
  - an input of the second machine learning model is coupled to a set of intermediate layers of the first machine learning model;
  - a first intermediate layer of the first machine learning model is coupled to a second intermediate layer of the second machine learning model; and
  - determining the set of objects and determining the set of behaviors for the set of objects is performed at least partially simultaneously;
  - matching locations of the set of objects with locations of the set of behaviors; and
- control one or more operations of a vehicle based on one or more of the set of objects and the set of behaviors.

13. The apparatus of claim 12, wherein the processing device is further configured to:
receive, at the input of the second machine learning model, a set of intermediate outputs from the set of intermediate layers of the first machine learning model.

14. The apparatus of claim 13, wherein each intermediate output of the set of intermediate outputs is received from a different intermediate layer of the first machine learning model.

15. The apparatus of claim 13, wherein each intermediate output of the set of intermediate outputs is by generate by a same intermediate layer of the first machine learning model at different times.

16. The apparatus of claim 13, wherein different subsets of the set of intermediate outputs are generated by different intermediate layers at different times.

17. The apparatus of claim 13, wherein:
the set of intermediate outputs comprises one or more feature maps generated by one or more filters of the set of intermediate layers.

18. The apparatus of claim 12, wherein the processing device is further configured to:
training the first machine learning model and the second machine learning model based on a set of training data, wherein the second machine learning model is trained without receiving the set of training data at the input of the second machine learning model.

19. The apparatus of claim 12, wherein:
the set of objects within the environment comprises one or more pedestrians within the environment; and
the set of behaviors comprises one or more directions of movement of the one or more pedestrians.

20. A non-transitory computer readable medium having instruction stored thereon that, when executed by a processing device, cause the processing device to:
- receive, at an input of a first machine learning model, first input data representing an environment;
- determine, by the first machine learning model, a set of objects within the environment based on the first input data;
- determine, by a second machine learning model, a set of behaviors for the set of objects, wherein:
  - an input of the second machine learning model is coupled to a set of intermediate layers of the first machine learning model;
  - a first intermediate layer of the first machine learning model is coupled to a second intermediate layer of the second machine learning model; and
  - determining the set of objects and determining the set of behaviors for the set of objects is performed at least partially simultaneously;
- matching locations of the set of objects with locations of the set of behaviors; and
- control one or more operations of a vehicle based on one or more of the set of objects and the set of behaviors.

* * * * *